United States Patent
Chen et al.

(10) Patent No.: US 8,280,890 B2
(45) Date of Patent: Oct. 2, 2012

(54) COMPUTING DEVICE AND METHOD FOR SEARCHING FOR PARAMETERS IN A DATA MODEL

(75) Inventors: Bin-Rong Chen, Taipei Hsien (TW); Chih-Yuan Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 170 days.

(21) Appl. No.: 12/894,159

(22) Filed: Sep. 30, 2010

(65) Prior Publication Data

US 2012/0036133 A1 Feb. 9, 2012

(30) Foreign Application Priority Data

Aug. 4, 2010 (CN) .......................... 2010 1 0245054

(51) Int. Cl.
*G06F 17/30* (2006.01)
(52) U.S. Cl. ...................................................... 707/747
(58) Field of Classification Search .................. 707/747
See application file for complete search history.

(56) References Cited

U.S. PATENT DOCUMENTS 6,516,320 B1 * 2/2003 Odom et al. ................. 707/747
2007/0106640 A1 * 5/2007 Shankara ......................... 707/3

* cited by examiner

*Primary Examiner* — Rehana Perveen
*Assistant Examiner* — Alexander Khong
(74) *Attorney, Agent, or Firm* — Altis Law Group, Inc.

(57) ABSTRACT

A computing device and method for searching for parameters in a data model uses a first hash table to store index values of all parameter names in a data model, and uses a second hash table to store index values of data paths of duplicate parameters names in the data model, and changes the comparison sequence when searching for parameters in the data model. That is, comparing beginning from the last character in the input data string, if a leaf node in the data model matches the last character, then comparing parent nodes of the leaf node with the remaining characters of the input data string. Then, a data path of a parameter having a unique name is located according to the first hash table. Furthermore, data paths of parameters having duplicate names is located according to the second hash table.

18 Claims, 8 Drawing Sheets

| Index value | Duplicate | Dynamic | Record |
|---|---|---|---|
| 1 | 0 | 0 | Mo_A_B_Ptr |
| 2 | 1 | 0 | NULL |
| 3 | 0 | 0 | Mo_A_E_I_Ptr |
| 4 | 0 | 0 | Mo_A_D_F_J_Ptr |
| 5 | 1 | 0 | NULL |
| 6 | 1 | 1 | NULL |
| 7 | 0 | 1 | Mo_A_C_H_N_Ptr_List |
| 8 | 0 | 1 | Mo_A_D_H_L_O_Ptr_List |

| Key word |
|---|
| B |
| G |
| I |
| J |
| K |
| M |
| N |
| O |

FIG. 6

Figure 1:
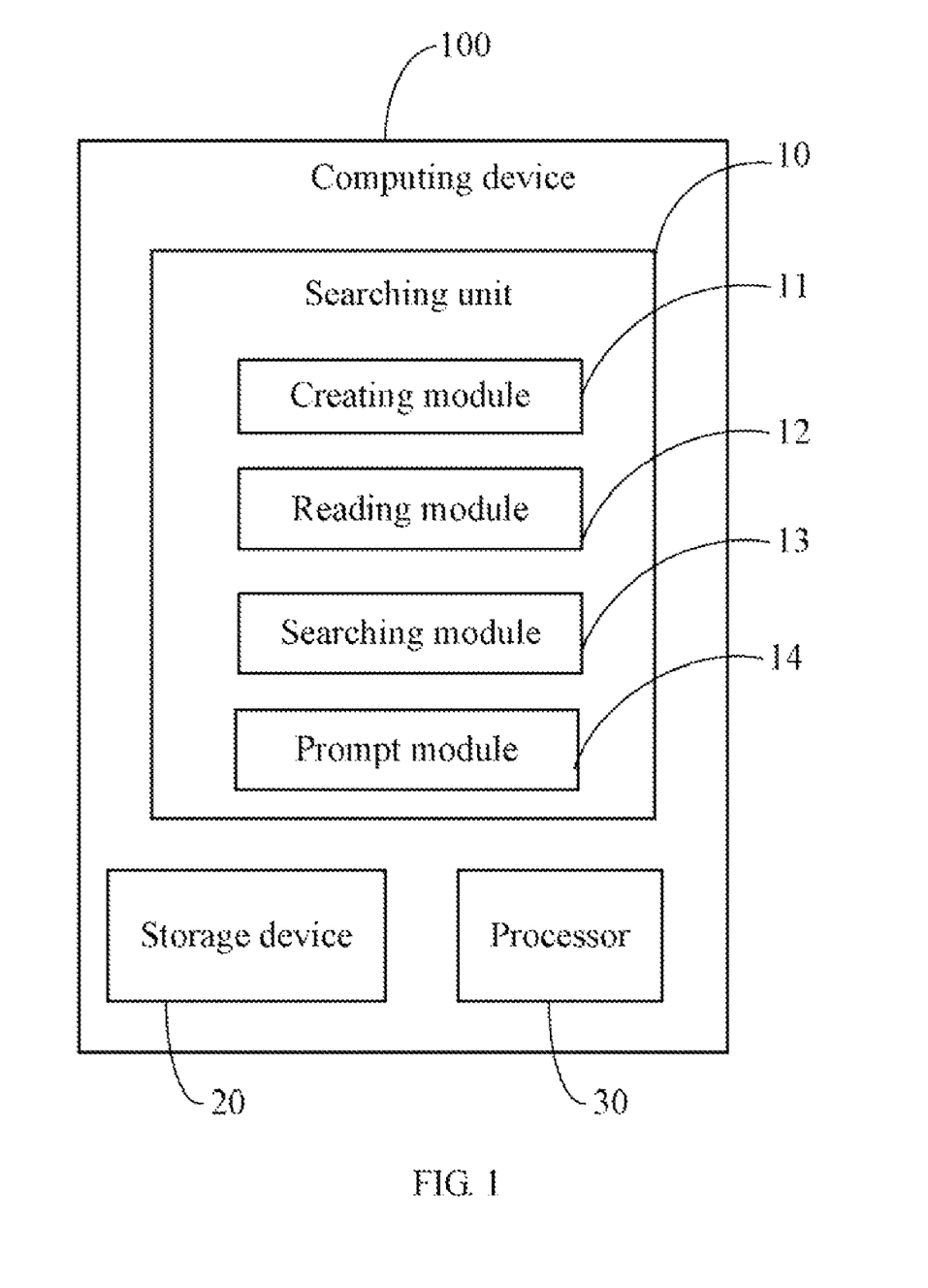
FIG. 1 is a block diagram of one embodiment of a computing device for searching for parameters in a data model.

FIG. 7 as a creating module 11, a reading module 12, a searching module 13, and a prompt module 14. The modules 11-14 may comprise computerized code in the form of one or more programs that are stored in the storage device 20. The computerized code includes instructions that are executed by the processor 30 to provide functions for modules 11-14 (detailed description refers to FIG. 2A and FIG. 2B). Depending on the embodiment, the storage device 20 may be a smart media card, a secure digital card, or a compact flash card.

COMPUTING DEVICE AND METHOD FOR SEARCHING FOR PARAMETERS IN A DATA MODEL

BACKGROUND

1. Technical Field

Embodiments of the present disclosure relates to data search methods, and more particularly, to a computing device and method for searching for parameters in a data model.

2. Description of Related Art

The broadband forum (DSL forum) has released TR-098 as a data model for network devices. TR-098 defines varieties of data objects that contain all necessary parameters for a network device. All parameters are named according to a hierarchical form similar to a tree (e.g., "x.y.z"). At present, to search for a parameter for obtaining its access function in a TR-098 like data model, what is often done is to compare characters in an input data string with characters in predefined parameter name strings from the head to the tail of the input data string. The aforementioned linear searching method may be time-consuming if the number of the characters in the input data string is large.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 is a block diagram of one embodiment of a computing device 100. In one embodiment, the computing device 100 includes a searching unit 10, a storage device 20, and a processor 30. The computing device 100 may be a personal computer or a server, and the searching unit 10 includes a plurality of function modules, such as a creating module 11, a reading module 12, a searching module 13, and a prompt module 14. The modules 11-14 may comprise computerized code in the form of one or more programs that are stored in the storage device 20. The computerized code includes instructions that are executed by the processor 30 to provide functions for modules 11-14 (detailed description refers to FIG. 2A and FIG. 2B). Depending on the embodiment, the storage device 20 may be a smart media card, a secure digital card, or a compact flash card.

Figure 2A:
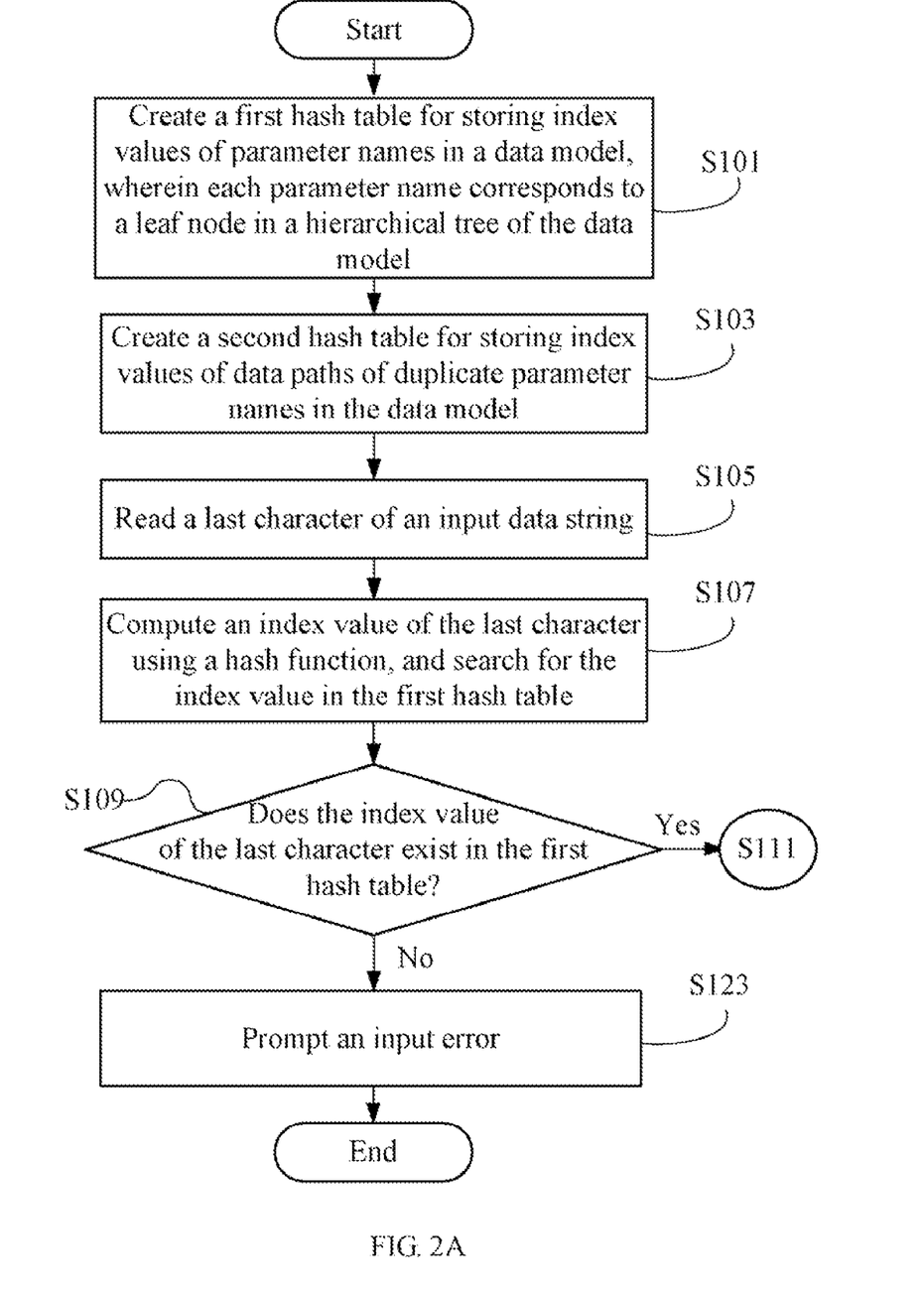
FIG. 2A and FIG. 2B are flowcharts of one embodiment of a method for searching for parameters in a data model.
Figure 2B:
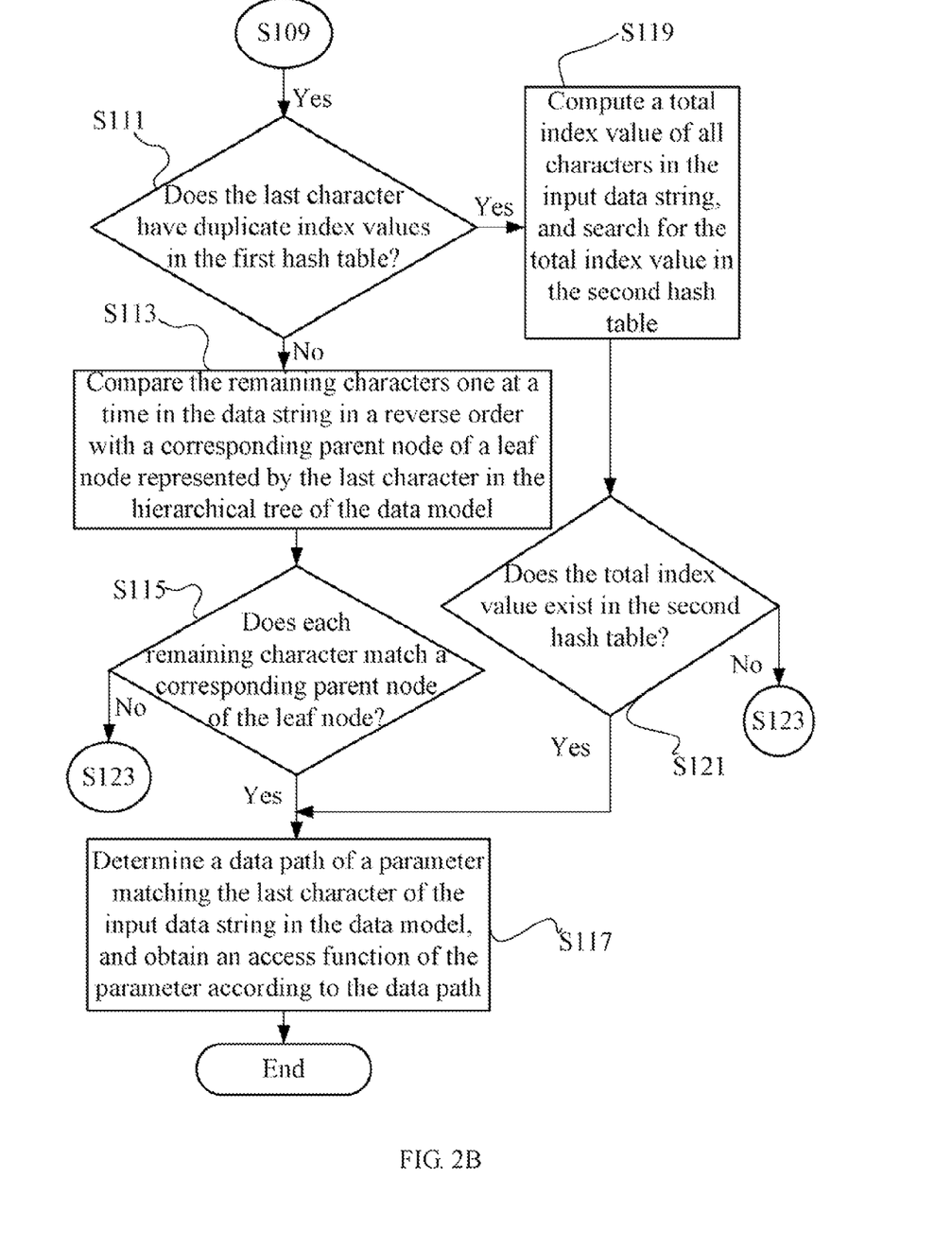

FIG. 2A and FIG. 2B are flowcharts of one embodiment of a method for searching for parameters in a data model. Depending on the embodiment, additional blocks may be added, others removed, and the ordering of the blocks may be changed.

Figure 3:
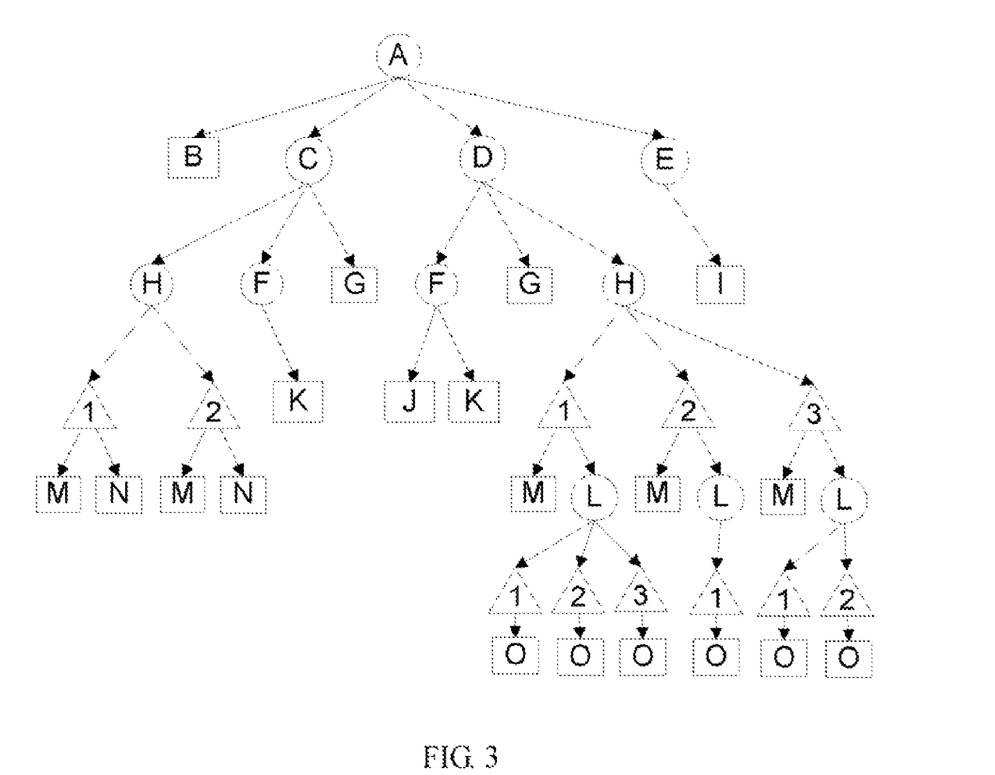
FIG. 3 is a hierarchical tree structure of an example data model according to one embodiment.

In block S101, the creating module 11 creates a first hash table for storing index values of parameter names in a data model, where each parameter name corresponds to a leaf node in a hierarchical tree of the data model (please refer to FIG. 3). In one embodiment, the index values of the parameter names are computed using a hash function, and the first hash table is stored in the storage device 20 of the computing device 100.

FIG. 3 gives a hierarchical tree structure of an example data model. As shown in FIG. 3, circles represent data objects, rectangles represent parameters, and triangles represent the items of data objects having the same name in the example data model. It is understood that, a data model consists of a plurality of data objects and parameter, and each data objects may further consists of sub data objects and parameters. Data objects having unique names are regarded as static objects, data objects have the same name but different items are regarded as dynamic objects, parameters of the static objects are regarded as static parameters, and parameters of the dynamic objects are regarded as dynamic parameters. For example, in FIG. 3, the static objects includes "A," "C," "D," "E," and "F," the dynamic objects include "H," and "L," the static parameters include "B," "G," "I," "J," and "K," and the dynamic parameters include "M," "N," and "O."

Figure 4:
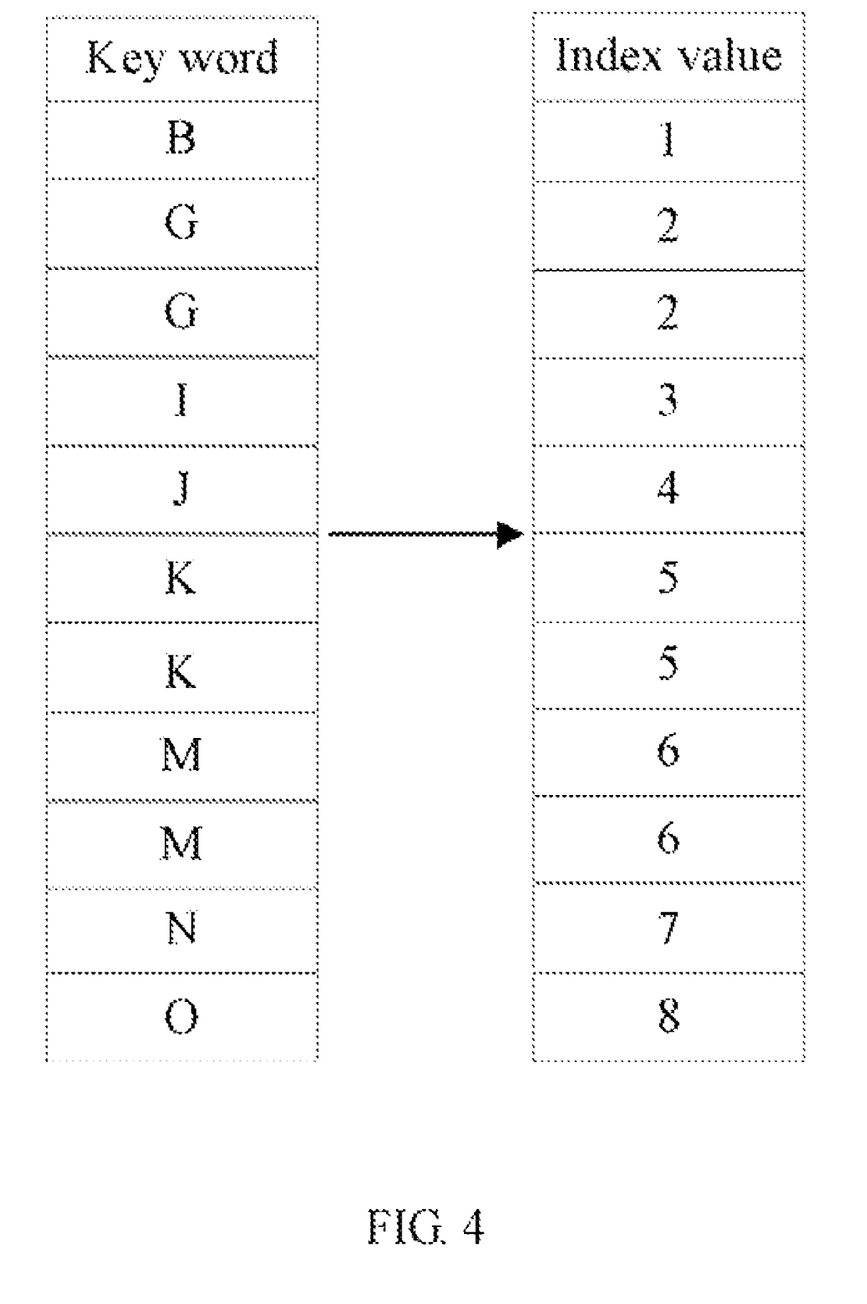
FIG. 4 illustrates a first hash table of parameters in the example data model in FIG. 3 according to one embodiment.
Figure 6:
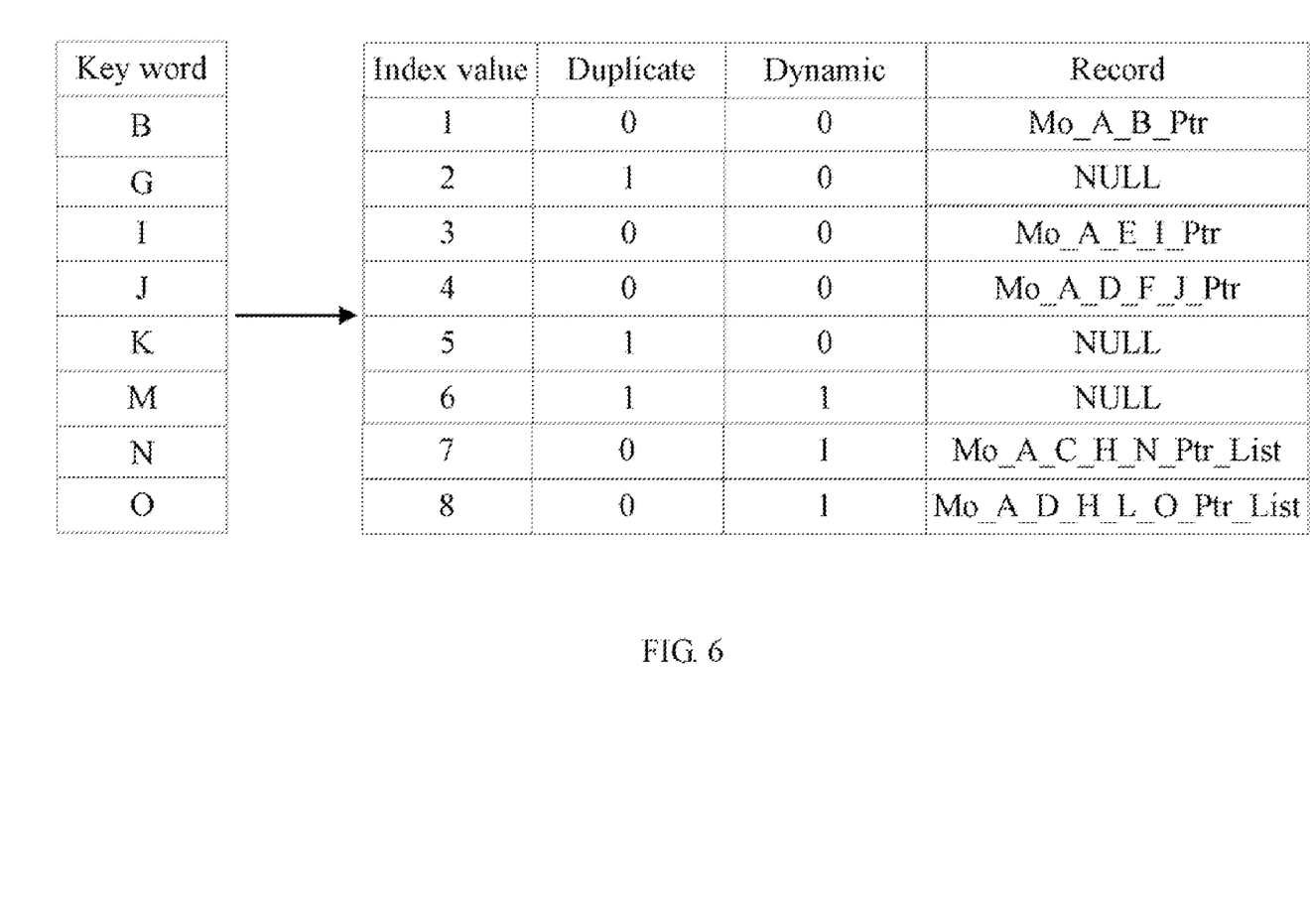
FIG. 6 illustrates a result of searching for parameters in the first hash table in FIG. 4 according to one embodiment.

It is further understood that, in the data model, all parameters are leaf nodes of the tree. FIG. 4 illustrates the first hash table of the parameters in the example data model of FIG. 3. In the first hash table, the parameter names are key words, each parameter name maps to an index value, and each index value may further map to a record of a data path of a parameter in the example data model (please refer to FIG. 6). When the data path of the parameter is determined, an access function of the parameter can be obtained according to the record of the data path from the storage device 20 of the computing device 100.

In block S103, the creating module 11 creates a second hash table for storing index values of data paths of duplicate parameter names in the data model. In this embodiment, the index values of data paths of the duplicate parameter names in the data model are also computed using the hash function, and the second hash table is also stored in the storage device 20 of the computing device 100.

As shown in FIG. 3, in the example data model, duplicate parameter names include "G," "K," "M." The duplicate parameter names have duplicate index values in the first table shown in FIG. 4. However, the duplicate parameter names have different data paths in the example model. For example, the duplicate parameter names "G" have two different data paths "A.C.G" and "A.D.G," the duplicate parameter names "K" have two different data paths "A.C.F.K" and "A.D.F.K," and the duplicate parameter names "M" have two different data paths "A.C.H.M" and "A.D.H.M".

Figure 5:
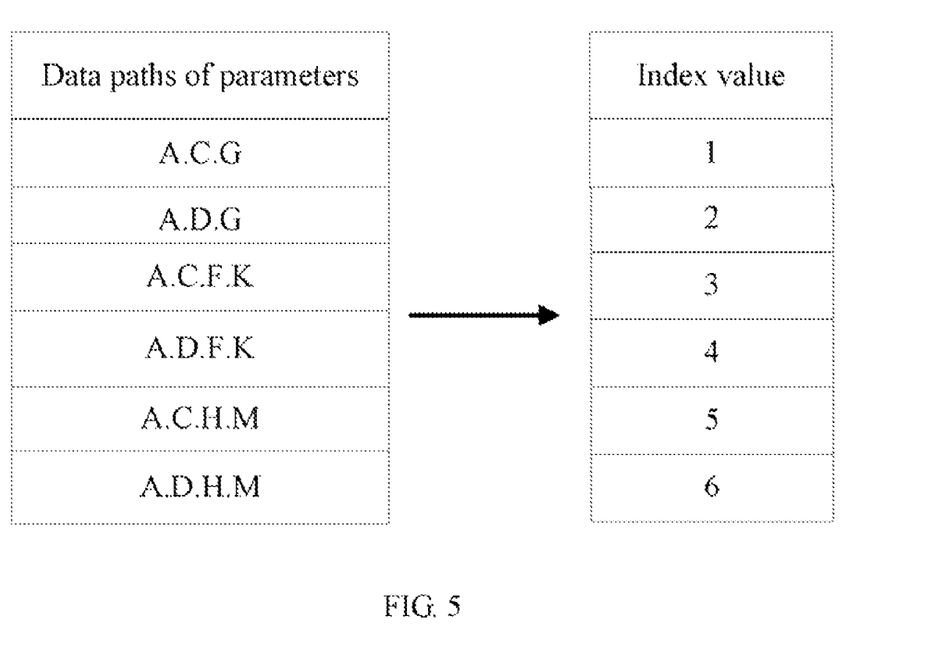
FIG. 5 illustrates a second hash table of parameters in the example data model in FIG. 3 according to one embodiment.
Figure 7:
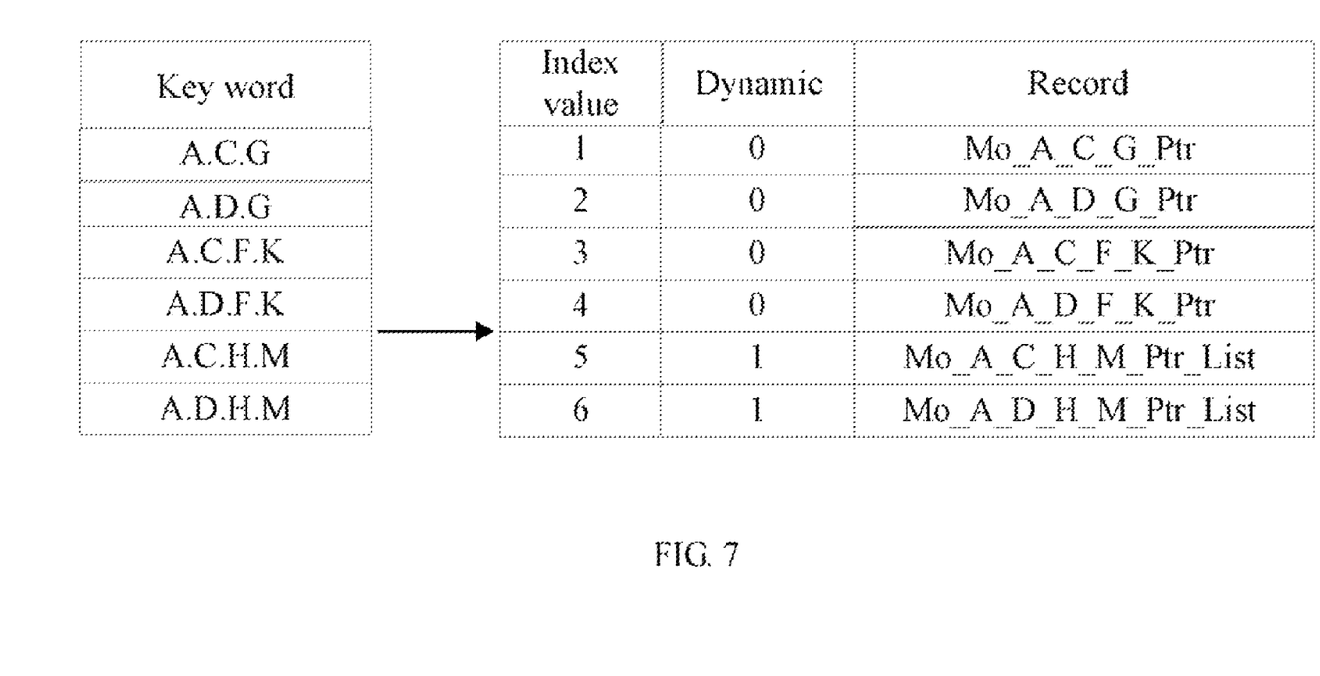
FIG. 7 illustrates a result of searching for duplicate parameters in the second hash table in FIG. 5 according to one embodiment.

FIG. 5 illustrates the second hash table of the duplicate parameter names in the example data model of FIG. 3. In the second hash table, data paths of the duplicate parameter names are key words, each data path maps to an index value, and each index value may further map to a record of a data path of a parameter in the example data model (referring to FIG. 7).

In block S105, the reading module 12 reads a last character of an input data string. For example, if the input data string is "A. D. F. J", then the character "J" is read, and if the input data string is "A. C. G", then the character "G" is read.

In block S107, the searching module 13 computes an index value of the last character using the hash function, and searches for the index value in the first hash table. For example, the index value of the character "J" is 4, and the index value of the character "G" is 2.

In block S109, the searching module 13 determines if the index value of the last character exists in the first hash table. If the index value of the last character does not exist in the first hash table, which means there is no parameter name in the data model matching the last character, the procedure goes to block S123, the prompt module 14 causes a dialog box to be displayed on a display (not shown) of the computing device 100 to announce the input error. Otherwise, if the index value of the last character exists in the first hash table, which means there is at least one parameter name in the data model matching the last character, the procedure goes to block S111.

In block S111, the searching module 13 determines if the last character has duplicate index values in the first hash table. If the last character has duplicate index values in the first hash table, which means there is duplicate parameter names in the data model matching the last character, the procedure goes to block S119. For example, as shown in FIG. 4, the character "G" has duplicate index values 2 in the first hash table, so the procedure goes to block S119. Otherwise, if the last character has a unique index value in the first hash table, which means there is a unique parameter name in the data model matching the last character, the procedure goes to block S113. For example, as shown in FIG. 4, the character "J" has a unique index value 4 in the first hash table, so the procedure goes to block S113.

In block S113, the searching module 13 compares the remaining characters one at a time in the data string in a reverse order with a corresponding parent node of a leaf node represented by the last character in the hierarchical tree of the data model. For example, excluding the last character "J" in the input data string "A. D. F. J", the remaining characters are "A," "D," and "F," then the reverse sequence of the remaining characters is "F," "D," and "A." As shown in FIG. 3, the parent nodes of the leaf node "J" include "A," "D," and "F," and the reverse sequence of the parent nodes of the leaf node "J" is also "F," "D," and "A." Then, each member in the reverse sequence of the remaining characters is compared to each member in the reverse sequence of the parent nodes of the leaf node.

In block S115, the searching module 13 determines if each remaining character matches a corresponding parent node of the leaf node. If any remaining character does not match a corresponding parent node of the leaf node, the procedure goes to block S123. Otherwise, if each remaining character matches a corresponding parent node of the leaf node, the procedure goes to block S117. For example, as mentioned above, excluding the last character "J" in the input data string "A. D. F. J", the reverse sequence of the remaining characters is the same as the reverse sequence of the parent nodes of the leaf node "J" in the example data model, so the procedure goes to block S117.

In block S117, the searching module 13 determines a data path of a parameter matching the last character of the input data string in the data model, and obtains an access function of the parameter from the storage device 20 according to the data path. For example, a data path of the parameter "J" is "A. D. F. J", and the access function of the parameter "J" may be obtained according to the record "Mo_A_D_F_J_Ptr" from the storage device 20 (please refer to FIG. 6).

In block S119, the searching module 13 computes a total index value of all characters in the input data string using the hash function, and searches for the total index value in the second hash table. As mentioned above, if the input data string is "A. C. G", because the character "G" has duplicate index values 2 in the first hash table, a record of the character "G" cannot be found according to the first hash table (please refer to FIG. 6). Then, a total index value of all characters in the input data string "A. C. G" is computed using the hash function.

In block S121, the searching module 13 determines if the total index value exists in the second hash table. If the total index value does not exist in the second hash table, the procedure goes to block S123. Otherwise, if the total index value exists in the second hash table, the procedure goes to block S117. For example, the total index value of all characters in the input data string "A. C. G" is 1 that exists in the second hash table, so the procedure goes to block S117. Then, in block S117, the searching module 13 determines a data path of a parameter matching the last character of the input data string in the data model, and obtains an access function of the parameter from the storage device 20 according to the data path. For example, a data path of the parameter "G" is "A. C. G", and the access function of the parameter "G" may be obtained according to the record "Mo_A_C_G_Ptr" from the storage device 20 (please refer to FIG. 7).

The above embodiments use the first hash table to store index values of all parameter names in a data model, and use the second hash table to store index values of data paths of duplicate parameters names in the data model, and change the comparison sequence when searching for parameters in the data model. That is, comparing starting from the last character in the input data string, if a leaf node in the data model matches the last character, then comparing parent nodes of the leaf node with the remaining characters of the input data string. Therefore, a data path of a parameter having a unique name can be quickly located according to the first hash table. Furthermore, data paths of parameters having duplicate names can be located according to the second hash table. Due to that all parameter names in TR-098 like data model are known and fixed, the search method can reduce unnecessary comparison effort and improve search speed.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-based method for searching parameters in a data model, comprising:
    (a) creating a first hash table for storing index values of parameter names in the data model, where each parameter name corresponds to a leaf node in a hierarchical tree of the data model;
    (b) creating a second hash table for storing index values of data paths of duplicate parameter names in the data model;
    (c) reading a last character of an input data string;

(d) computing an index value of the last character, and searching for the index value of the last character in the first hash table, ending the procedure if the index value of the last character does not exist in the first hash table, or going to block (e) if the index value of the last character exists in the first hash table;

(e) determining if the last character has duplicate index values in the first hash table, going to block (f) if the last character has duplicate index values in the first hash table, or going to block (g) if the last character has a unique index value in the first hash table;

(f) computing a total index value of all characters in the input data string, and searching for the total index value in the second hash table, ending the procedure if the total index value does not exist in the second hash table, or determining a data path of a parameter matching the last character of the input data string in the data model according to the first hash table if the total index value exists in the second hash table; and (g) comparing the remaining characters one at a time in the data string in a reverse order with a corresponding parent node of a leaf node represented by the last character in the hierarchical tree of the data model, ending the procedure if any of the remaining characters does not match a corresponding parent node of the leaf node, or determining a data path of a parameter matching the last character of the input data string in the data model according to the first hash table if each of the remaining characters matches a corresponding parent node of the leaf node.

2. The method as claimed in claim 1, wherein the first hash table and the second hash table are stored in a storage device of a computing device.

3. The method as claimed in claim 2, further comprising:
obtaining an access function of the parameter from the storage device of the computing device according to the data path of the parameter.

4. The method as claimed in claim 2, further comprising:
prompting an input error via a dialog box displayed on a display of the computing device before ending the procedure in block (d), block (f), or block (g).

5. The method as claimed in claim 2, wherein the index value of the last character and the total index value are computed by a processor of the computing device using a hash function.

6. The method as claimed in claim 1, wherein in the first hash table, the parameter names are key words, each parameter name maps to an index value, and each index value further maps to a record of a data path of a parameter in the data model.

7. The method as claimed in claim 1, wherein in the second hash table, data paths of the duplicate parameter names are key words, each data path maps to an index value, and each index value further maps to a record of a data path of a parameter in the data model.

8. A non-transitory computer readable medium storing a set of instructions, the set of instructions capable of being executed by a processor of a computing device to perform a method for searching parameters in a data model, the method comprising:

(a) creating a first hash table for storing index values of parameter names in the data model, where each parameter name corresponds to a leaf node in a hierarchical tree of the data model;

(b) creating a second hash table for storing index values of data paths of duplicate parameter names in the data model;

(c) reading a last character of an input data string;

(d) computing an index value of the last character, and searching for the index value of the last character in the first hash table, ending the procedure if the index value of the last character does not exist in the first hash table, or going to block (e) if the index value of the last character exists in the first hash table;

(e) determining if the last character has duplicate index values in the first hash table, going to block (f) if the last character has duplicate index values in the first hash table, or going to block (g) if the last character has a unique index value in the first hash table;

(f) computing a total index value of all characters in the input data string, and searching for the total index value in the second hash table, ending the procedure if the total index value does not exist in the second hash table, or determining a data path of a parameter matching the last character of the input data string in the data model according to the first hash table if the total index value exists in the second hash table; and (g) comparing the remaining characters one at a time in the data string in a reverse order with a corresponding parent node of a leaf node represented by the last character in the hierarchical tree of the data model, ending the procedure if any of the remaining characters does not match a corresponding parent node of the leaf node, or determining a data path of a parameter matching the last character of the input data string in the data model according to the first hash table if each of the remaining characters matches a corresponding parent node of the leaf node.

9. The medium as claimed in claim 8, wherein the first hash table and the second hash table stored in the medium of the computing device.

10. The medium as claimed in claim 9, wherein the method further comprises:
obtaining an access function of the parameter from the medium of the computing device according to the data path of the parameter.

11. The medium as claimed in claim 9, wherein the method further comprises:
prompting input error via a dialog box displayed on a display of the computing device before ending the procedure in block (d), block (f), or block (g).

12. The medium as claimed in claim 8, wherein the index value of the last character and the total index value are computed by the processor of the computing device using a hash function.

13. The medium as claimed in claim 8, wherein in the first hash table, the parameter names are key words, each parameter name maps to an index value, and each index value further maps to a record of a data path of a parameter in the data model.

14. The medium as claimed in claim 8, wherein in the second hash table, data paths of the duplicate parameter names are key words, each data path maps to an index value, and each index value further maps to a record of a data path of a parameter in the data model.

15. A computing device, comprising:
a storage device;
at least one processor; and
one or more computerized codes, which are stored in the storage device and executable by the at least one processor, the one or more computerized codes comprising:
a creating module operable to create a first hash table for storing index values of parameter names in the data model and a second hash table for storing index values of data paths of duplicate parameter names in the data model, where each parameter name corresponds to a leaf node in a hierarchical tree of the data model;
a reading module operable to read a last character of an input data string; and
a searching module operable to compute an index value of the last character, and searches for the index value of the last character in the first hash table under the condition that the last character has a unique index value in the first hash table, the searching module further operable to compute a total index value of all characters in the input data string, and searches for the total index value in the second hash table under the condition that the last character has duplicate index values in the first hash table, so as to determine a data path of a parameter matching the last character of the input data string in the data model according to the first hash table or the second hash table.

16. The computing device as claimed in claim 15, wherein under the condition that the last character has the unique index value in the first hash table, the searching module is operable to compare the remaining characters one at a time in the data string in a reverse order with a corresponding parent node of a leaf node represented by the last character in the hierarchical tree of the data model, and determine the data path of the parameter matching the last character of the input data string in the data model according to a record matching the unique index value in the first hash table in response that each of the remaining characters matches a corresponding parent node of the leaf node.

17. The computing device as claimed in claim 15, wherein under the condition that the last character has duplicate index values in the first hash table, the searching module is operable to determine the data path of the parameter matching the last character of the input data string in the data model according to a record matching the total index value in the second hash table.

18. The computing device as claimed in claim 16, wherein the one or more computerized codes further comprise:
a prompt module operable to prompt input error via a dialog box displayed on a display of the computing device under the condition that the index value of the last character does not exist in the first hash table, or the total index value does not exist in the second hash table, or any of the remaining characters does not match a corresponding parent node of the leaf node.

* * * * *